Sept. 1, 1931.  W. McKEE  1,820,984
CONNECTER
Filed March 10, 1926
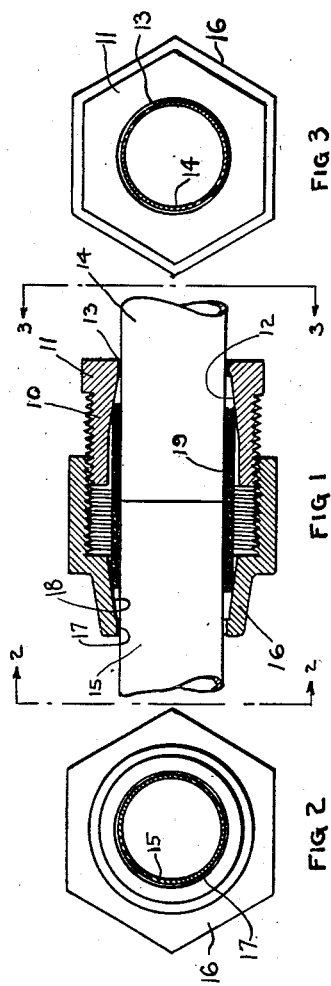
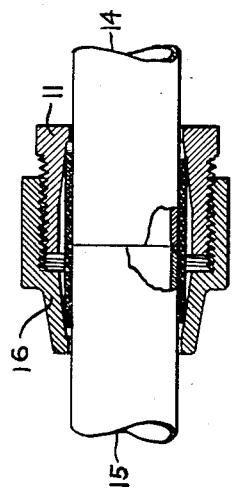
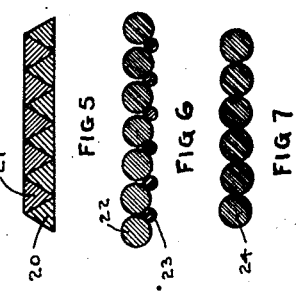
INVENTOR.
Willis McKee
BY Evans and McCoy.
ATTORNEYS Patented Sept. 1, 1931

1,820,984

UNITED STATES PATENT OFFICE

WILLIS McKEE, OF CLEVELAND, OHIO, ASSIGNOR TO THE CENTRAL-UNITED NATIONAL BANK, A CORPORATION OF THE UNITED STATES

CONNECTER

Application filed March 10, 1926. Serial No. 93,632.

This invention relates to couplings for joining cylindrical objects and particularly for joining unthreaded sections of thin walled tubing, such as that commonly used in forming conduits for electric wiring.

Thin walled tubing of the character generally used to form conduits for electric wiring and other purposes is very difficult to thread. It is easily damaged when threaded and difficult to cut to size and thread during installation.

The invention herein proposed overcomes this difficulty by providing a unitary assembled connecter that may be slipped over the abutted unthreaded end portions of the tube to be connected and readily tightened thereon by turning one element of the connecter relative to the other connecter element to provide a very strong water-excluding connection between the abutted ends of the unthreaded tubing without the use of special tools and without expanding or otherwise deforming or threading the abutted ends of the tubing. Both the connecters and the tubing may be repeatedly disassembled and reconnected without injury.

One of the objects of my invention is to provide a connecter of the above character that is assembled as a unitary device when manufactured and that need not be subsequently disassembled at any time, thus providing a device that is readily handled at the place of installation without loss of parts or the use of special tools and that will withstand rough treatment without resultant battering of exposed threads.

An additional object of the invention is to provide a connecter of inexpensive design that may be applied to the unthreaded ends of thin walled tubing by the use of a pair of ordinary wrenches and without the use of expanders, threading tools or other special equipment now conventionally used.

Figure 1 of the accompanying drawings is a longitudinal sectional view of an assembled connecter unit constructed in accordance with my invention, shown loosely mounted in position for subsequent tightening on the opposed ends of abutted thin walled tubing.

Fig. 2 is an end view of the connecter looking in the direction of the arrows associated with the line 2—2 of Fig. 1, showing a transverse section of the tubing to be connected thereby.

Fig. 3 is a corresponding view of the other end of the connecter looking in the direction of the arrows 3—3 of Fig. 1.

Fig. 4 is a longitudinal sectional view of the connecter tightened on the opposed end portions of the connected tubing, portions of the connected tubing being shown as broken away.

Fig. 5 is an enlarged cross-sectional view of a modified form of helical winding for use in a coupling constructed in accordance with this invention.

Fig. 6 is an enlarged cross-sectional view of a complex helical winding formed of round wires of different diameters for use in the coupling herein proposed; and Fig. 7 is a view of a simple helical winding of round wire shown in enlarged cross-section.

The connecter herein proposed comprises an externally threaded collar or open-ended sleeve 10 that preferably has a wrench engaging face 11 formed on one end thereof and that is internally provided with a wedging face 12 preferably of substantially conical form and disposed adjacent the open end 13. The opening through the collar is of sufficient size to freely receive the end portion of a section of tubing 14 that is to be connected with an abutting section of tubing 15 or with a suitably formed fitting.

A second sleeve 16 that is internally threaded to engage the external threads of the sleeve 10, has a wrench engaging face formed on its outer face. The sleeve 16 also has an internal conical or flared wedging face 17 formed adjacent the open end portion 18 of the sleeve and flared in opposed relation to the wedging face 12 of the sleeve 10.

A helical winding 19 of packing material is disposed within the opposed frusto conical or flared pockets 12 and 17 of the connected sleeves 10 and 16. This helical winding is preferably of relatively malleable metallic wire of polygonal and preferably quadrilateral cross-sectional form, although this packing material may be of any form or material that is adapted to provide the necessary mechanical connection between the ends of the tubing and the desired degree of fluid excluding sealed connection for the joint. The use of a packing material having a substantial area of lateral contacting face between adjacent turns of the helical winding serves to effectively exclude water from the connection and provides a compact cylindrical sleeve that tightly engages the face of the tubing connected thereby. This is desirable if the connected conduits or fittings are intended for use with electrical wiring.

Although the helical winding of packing material is illustrated in its preferred form as of a single helically wound wire of substantially square cross-section, any other desired form of helical winding could be used. A complex helix formed of wires 20 and 21 having different cross-sectional shapes as shown in enlarged section in Fig. 5 or of round wires 22 and 23 of different diameters as illustrated in Fig. 6 may also be effectively used. It is also desirable in some instances to use a simple helix of round wire 24 such as that shown in Fig. 7 with or without a coating of thick shellac, cement or other sealing material applied internally to the helical winding or to the opposed end portions of the connected tubing just prior to installation of the connecter in order to obtain a very inexpensive and water-tight connecter.

The helical winding is wound in the reverse direction from the direction of the screw threads formed on the sleeves 11 and 16 in order that when one of the sleeve elements is turned relative to the other to draw the two together, the opposite end portions of the packing will be engaged by the wedging faces or pockets of the connecter and turned in a direction causing the packing to be wound more tightly about the cylindrical face of the abutting end portions of the tube to be connected thereby. The tightening of the helical winding is also accompanied by the longitudinal compression of the helical packing, each turn being forced against the adjacent turns by the drawing together of the sleeve elements. In this way the entire winding of packing material is drawn tightly against the outer face of the tube and is simultaneously compressed longitudinally to a very great degree by the compacting pressure of the opposed sleeve members of the coupling.

The coupling herein proposed is assembled for shipment as shown in Fig. 1 without, of course, being mounted on the abutting ends of the tubing to be connected. The threaded portions of the connecter are protected by their interengagement and the helical winding or packing is completely housed within the connecter. The complete unit as intended for commercial use comprises opposed end portions 10 and 16 and the packing material 19 assembled as shown in Fig. 1. The helical winding of packing material is preferably of substantially the same internal diameter as the openings through the opposite ends of the sleeve elements. The opening through the assembled unit is somewhat larger than the tubing to be connected thereby. The connecter may, therefore, readily be placed over the abutting unthreaded ends of the tube, since it loosely fits thereon, and the sleeve portions turned to rigidly connect the abutting tubes. The packing is preferably formed of metal wire although other desired material may be used. The metal wire may either be relatively soft and malleable or of tempered steel. A mild tempered steel wire is preferably used if the connecter is to be repeatedly used. Packing of malleable metal tends to more readily conform to any slight irregularities in the tube ends, such as flattened or roughened portions. With the relative movement of the connecter portions in turning one with respect to the other, the packing is tightened on the tubular member and the joint between the opposed ends of the tube is made substantially tight and very rigid. With very thin walled tubing, the end portions of the helical winding may actually be forced into the side wall of the tubing thus providing an extremely durable and rigid connection.

Unthreaded thin walled tubing is much less expensive to make than threaded tubing or tubing intended to be threaded at the place of installation and it can be shipped to the place of installation without the careful handling required with threaded tubing. No special tools are required for its installation because it may be cut by an ordinary saw and irregularities in the end faces are not detrimental. The installation of the unthreaded tubing using the proposed connecter is very rapid, and the tubing sections are accurately aligned regardless of irregular end faces. These are material commercial advantages of considerable importance.

Furthermore, it is to be understood that the particular forms of the proposed connecter shown and described, and the procedure set forth, are presented for purposes of explanation and illustration and that various modifications of said connecter and the method of mounting can be made without departing from my invention as defined in the appended claims.

The arrangement whereby the frictional engagement of the ends of the helix with the coupling members to cause the tightening of the helix is an important feature and advantageous as compared with any recess and projection arrangement, which would require an accurate fitting of the parts.

What I claim is:

1. A coupling for connecting unthreaded tubular conduits comprising, an open-ended sleeve member having a conical seating face formed on the interior face thereof adjacent one end, an internally threaded portion and an external wrench-engaging face, a second member also having a conical seating face, an externally threaded portion adapted to engage and interlock with the threaded portion of said first-named member, and an external wrench-engaging face formed thereon, a helical winding of greater internal diameter than the diameter of the tubular bodies to be connected thereby carried within the opposed conical seating faces of said threaded members, said winding being formed of inherently non-plastic steel wire of quadrilateral cross-sectional form and being adapted to be tightened by the relative turning of said members in a direction drawing said members toward each other to press the end portions of said winding between said seating faces and the end portions of the conduits connected thereby and to force the winding radially into gripping contact with the abutted end portions of the conduit sections to provide a moisture excluding joint between the abutted tubular members.

2. A coupling for connecting two aligned smooth-surfaced tubes comprising a helix of inherently non-plastic, non-compressible material freely rotatable around the adjacent ends of the tubes, and relatively rotatable parts around the helix and having interengaging screw threads tapering inner walls on said rotatable parts, the said inner walls engaging intimately and frictionally with the opposite ends of the helix and serving when rotated relatively to create a frictional engagement at the ends of the helix sufficient to contract the helix axially into substantially liquid tight contact of the turns of the helix with each other and radially into similar contact of the helix with the tubes.

In testimony whereof I affix my signature.

WILLIS McKEE.